(12) United States Patent  
Che et al.

(10) Patent No.: US 8,218,075 B2  
(45) Date of Patent: Jul. 10, 2012

(54) METHOD AND SYSTEM FOR EFFICIENT DE-INTERLACING

(75) Inventors: Wei Che, Hai Dian District (CN); Hui De Li, Beijing (CN); Lin Li, Beijing (CN)

(73) Assignee: Analog Devices, Inc., Norwood, MA (US)

( * ) Notice: Subject to any disclaimer, the term of this patent is extended or adjusted under 35 U.S.C. 154(b) by 767 days.

(21) Appl. No.: 12/367,148

(22) Filed: Feb. 6, 2009

(65) Prior Publication Data

US 2010/0201868 A1 Aug. 12, 2010

(51) Int. Cl.  
*H04N 11/20* (2006.01)

(52) U.S. Cl. .......... 348/448; 348/452

(58) Field of Classification Search .......... 348/448, 348/452, 699–701; 382/298–300; 345/606, 345/610, 698  
See application file for complete search history.

(56) References Cited

U.S. PATENT DOCUMENTS

| | | | |
|---|---|---|---|
| 6,133,957 A | 10/2000 | Campbell | |
| 6,421,090 B1 | 7/2002 | Jiang et al. | |
| 6,512,550 B1 * | 1/2003 | de Garrido et al. | 348/452 |
| 6,900,846 B2 * | 5/2005 | Lee et al. | 348/459 |
| 7,047,265 B2 | 5/2006 | Peterson et al. | |
| 7,202,908 B2 | 4/2007 | Zhou et al. | |
| 7,259,794 B2 | 8/2007 | Chang et al. | |
| 7,362,376 B2 | 4/2008 | Winger et al. | |
| 7,362,378 B2 * | 4/2008 | Orlick | 348/452 |
| 7,454,089 B2 | 11/2008 | Lin et al. | |
| 7,944,503 B1 * | 5/2011 | Zhai et al. | 348/452 |
| 2002/0036705 A1 * | 3/2002 | Lee et al. | 348/459 |
| 2002/0171759 A1 * | 11/2002 | Handjojo et al. | 348/452 |
| 2005/0206785 A1 * | 9/2005 | Swan et al. | 348/448 |
| 2005/0253963 A1 * | 11/2005 | Wong | 348/452 |
| 2006/0039631 A1 | 2/2006 | Chao | |
| 2007/0126037 A1 | 7/2007 | Kim et al. | |
| 2007/0177056 A1 | 8/2007 | Zhou et al. | |
| 2008/0024658 A1 | 1/2008 | Wang et al. | |
| 2009/0195691 A1 * | 8/2009 | Wyman | 348/452 |

OTHER PUBLICATIONS

PCT International Search Report and Written Opinion mailed on Apr. 8, 2010, from PCT/US10/022799.  
Lin et al., 2003, "Motion Adaptive Interpolation with Horizontal Motion Detection for Deinterlacing", IEEE Transactions on Consumer Electronics, 49(4):1256-1265.  
International Preliminary Report on Patentability mailed on Aug. 18, 2011, from PCT/US10/022799.

* cited by examiner

*Primary Examiner* — Victor Kostak  
(74) *Attorney, Agent, or Firm* — Kenyon & Kenyon LLP

(57) ABSTRACT

A system and a method may include performing a coarse estimation to eliminate at least one direction from a set of edge candidate directions without directly evaluating each direction; performing a fine estimation to select a single direction as corresponding to an edge; and performing a directional interpolation as a function of the single selected direction to generate a pixel value for a pixel being interpolated.

41 Claims, 15 Drawing Sheets

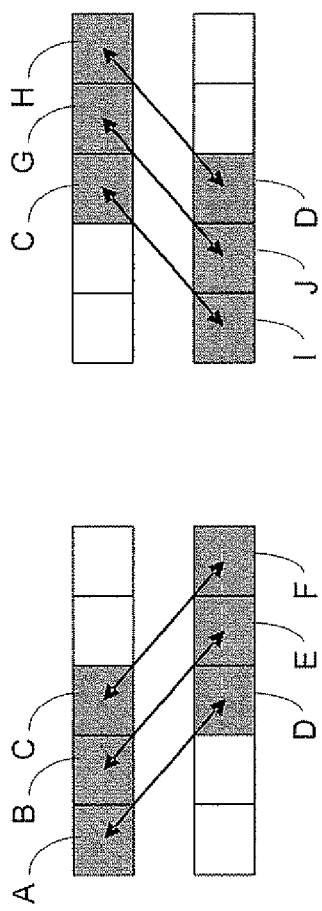
Fig. 8
Fig. 9
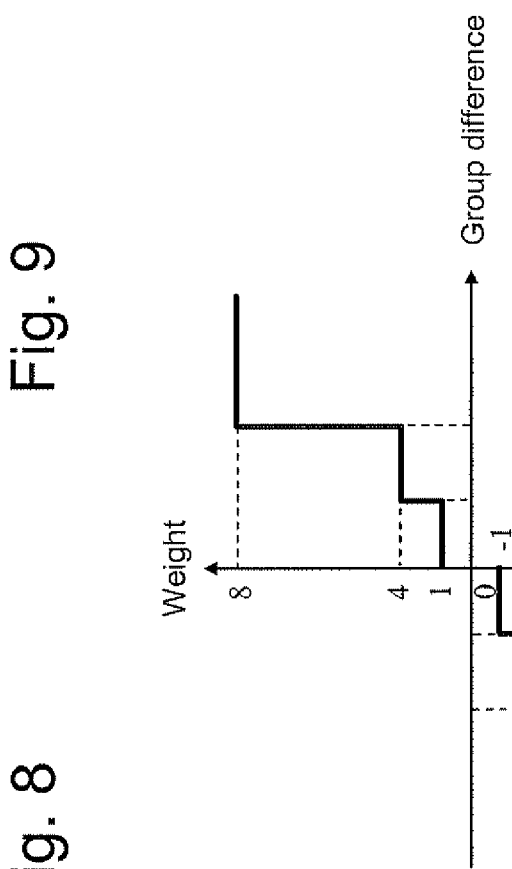
Fig. 10

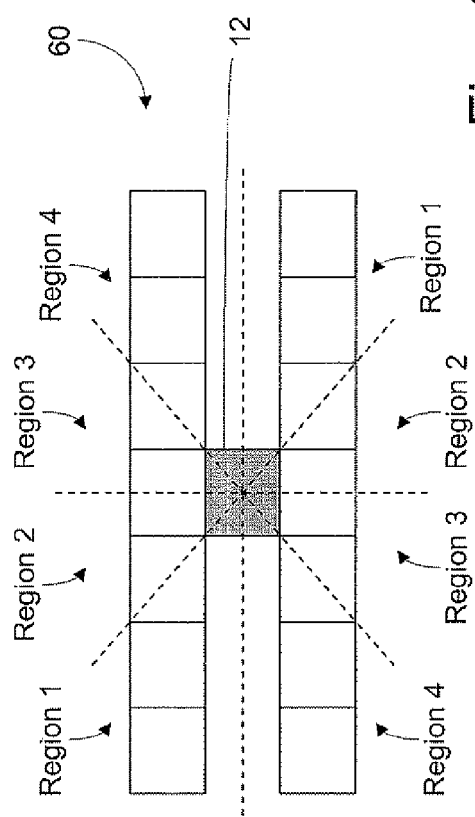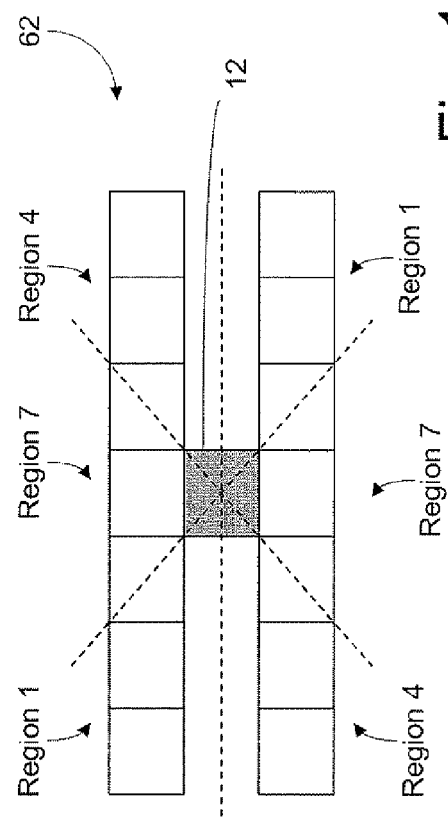

Direction smoothness = abs(A-B) + abs(B-C) + abs(C-D) + abs(D-E)

METHOD AND SYSTEM FOR EFFICIENT DE-INTERLACING

BACKGROUND INFORMATION

With the development of flat panel displays such as LCDs and PDPs, there arose a need to convert from an interlaced video format to a format used in the newer displays, i.e., progressive scanning. With interlacing, frames of a video are broken up into fields, where consecutive fields are configured to display alternating lines of a frame. One field may display only odd rows of pixels while the next field displays only even rows of pixels. When scanned at a sufficiently high frequency, sequential displaying of the fields produces what the human eye perceives as a complete image. In contrast, progressive scan is a technique in which an entire frame may be scanned without skipping any rows. Rows may be scanned sequentially until the entire frame is displayed.

Various techniques for de-interlacing have been developed. The techniques can be generally divided into two categories: intra-field and inter-field. Intra-field techniques utilize image information from within a single field. For example, one method involves line doubling, which fills in the missing lines by repeating existing field lines. Inter-field techniques utilize image information from two or more fields. Weaving, which involves adding consecutive fields together, is one example. Another example is blending, which combines consecutive fields by averaging their pixel values.

Each of the above techniques has its advantages and drawbacks. Accordingly, it is common practice to combine techniques. Motion-adaptive de-interlacing, for example, often applies intra-field techniques to field regions for which motion is detected between successive fields and inter-field techniques to static regions. Although it may be desirable to use complex techniques or combine multiple techniques, performance considerations should be balanced against cost. Factors that may be considered relate to computing resources (e.g., processing power, computation time, power consumption, etc.) and the cost of manufacturing a de-interlacing circuit. Current de-interlacing techniques tend to be focused on performance rather than efficiency. It is therefore an object of the present invention to provide for faster and less computationally expensive de-interlacing. Further, the present invention provides a low-cost alternative and performs better in static regions (e.g., improved image stability and decreased flicker) compared to existing low-cost techniques as a result of features such as accurate direction estimation and anti-flicker filtering. These and other features of the present invention are described below.

SUMMARY

A first exemplary embodiment of the present invention relates to a method of intra-field de-interlacing, including the steps of performing a coarse estimation to eliminate at least one direction from a set of edge candidate directions without directly evaluating each direction; performing a fine estimation to select a single direction as corresponding to an edge; and performing a directional interpolation as a function of the single selected direction to generate a pixel value for a pixel being interpolated.

A second exemplary embodiment of the present invention relates to a device for intra-field de-interlacing, including a coarse estimation unit configured to eliminate at least one direction from a set of edge candidate directions without directly evaluating each direction; a fine estimation unit configured to select a single direction as corresponding to an edge; and an interpolation unit configured to perform a directional interpolation as a function of the single selected direction to generate a pixel value for a pixel being interpolated.

A third exemplary embodiment of the present invention relates to a computer-readable storage medium having stored thereon a series of instructions executable by a processor, the instructions are configured to cause the processor to perform the steps of: performing a coarse estimation to eliminate at least one direction from a set of edge candidate directions without directly evaluating each direction; performing a fine estimation to select a single direction as corresponding to an edge; and performing a directional interpolation as a function of the single selected direction to generate a pixel value for a pixel being interpolated.

BRIEF DESCRIPTION OF THE DRAWINGS

FIG. 8 shows a pixel configuration for calculating a first difference value according to an example embodiment of the present invention.

FIG. 9 shows a pixel configuration for calculating a second difference value according to an example embodiment of the present invention.

FIG. 10 shows a group difference weight curve according to an example embodiment of the present invention.

FIG. 17 shows a first region configuration according to an example embodiment of the present invention.

FIG. 18 shows a second region configuration according to an example embodiment of the present invention.

DETAILED DESCRIPTION OF EXAMPLE EMBODIMENTS

Figure 1:
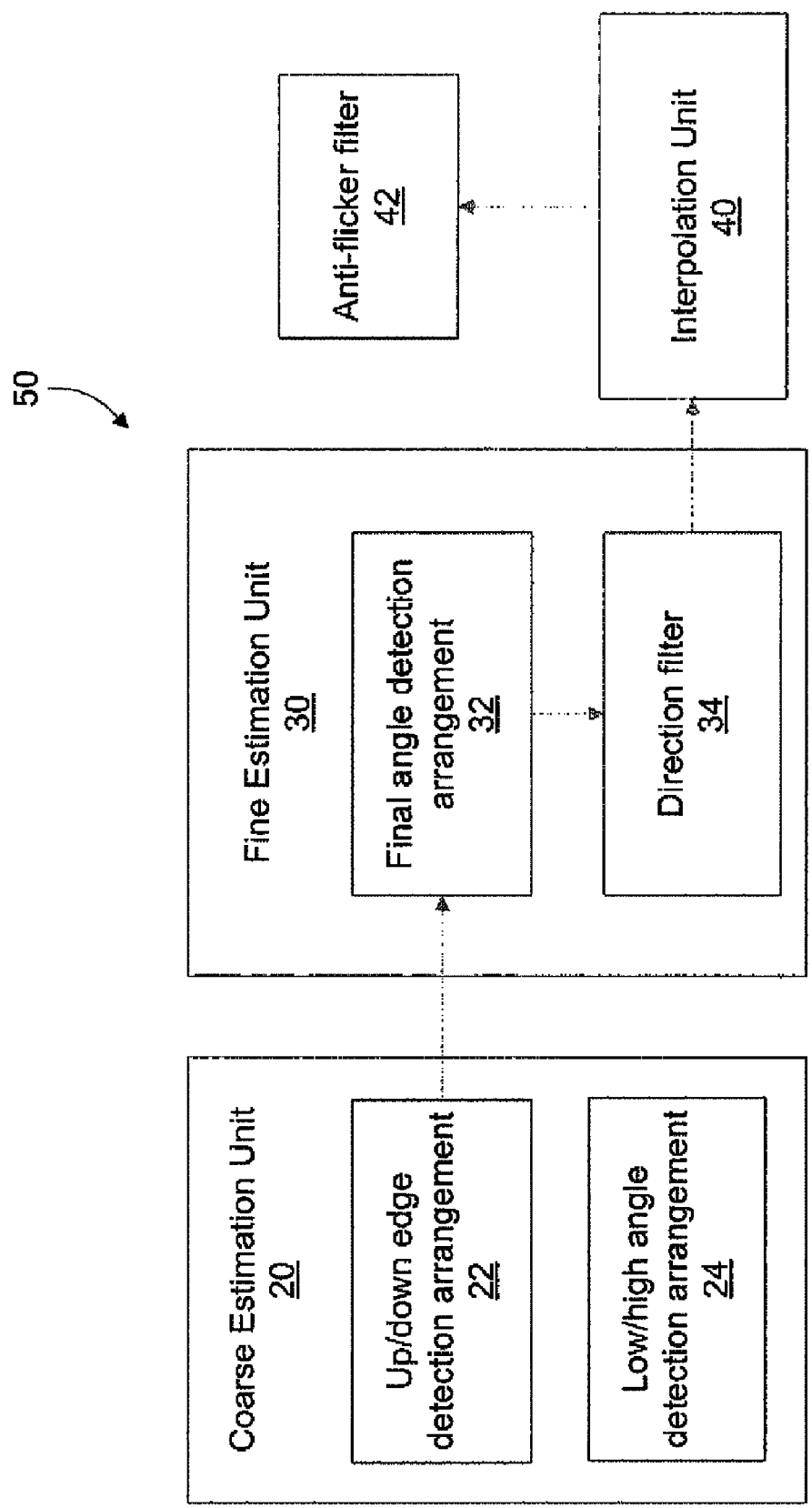
FIG. 1 shows a block diagram of a system for de-interlacing according to an example embodiment of the present invention.

The present invention relates to methods and systems for de-interlacing. In particular, exemplary embodiments of the present invention relate to intra-field de-interlacing using multi-directional edge interpolation. As used throughout the specification, the term "pixel value" refers to a numerical representation of a pixel. In the case of grayscale images, this may refer to pixel luminance. In the case of color images, depending on the color space used, this may refer to luminance, chrominance, RGB or CMYK values, etc. However, for illustration purposes, it may be assumed that the pixel value is only the luminance value, e.g., color images may be treated as if converted to grayscale.

Edge interpolation is a common interpolation technique used to interpolate, i.e., fill in, missing pixels within a field. One method of performing edge interpolation is known as Edge Line Average (ELA) and involves analyzing pixel information to determine whether the pixel corresponds to an edge in an image. Typically, each direction along which the edge potentially lies is analyzed to determine the most likely direction of the edge. Analysis involves calculating difference values for each direction by subtracting the value of a pixel located along a scan line above the pixel being interpolated from the value of a pixel located along a scan line below the interpolated pixel. The above pixel and the below pixel are symmetrically located along the direction. After each difference value is calculated, the direction having the lowest difference value is chosen to be the highest correctional edge and a set of directions opposite the highest correctional edge are evaluated to determine whether there exists a dominant edge. For example, if the difference between the difference values of the highest correctional edge and the opposite edge exceed a threshold value, this may indicate a dominant edge along which a directional interpolation should be performed.

Accordingly, the pixel is interpolated using those pixels in the above and below scan lines which are located along the opposite edge. However, if the difference between the difference values does not exceed the threshold value, then the opposite edge is non-dominant and vertical interpolation is performed instead of directional interpolation. Accordingly, the pixels immediately above and below the interpolated pixel are used to generate a pixel value for the interpolated pixel.

Based on the above description of the ELA method of interpolation, determining the edge direction can be computation intensive because each direction must be evaluated before a set of potential edges is obtained. Accordingly, one aspect of the present invention relates to simplifying edge determination by first performing a coarse estimation to narrow the set of possible directions before performing a fine estimation to locate an exact direction. Exemplary embodiments of systems and methods according to the present invention will now be described. The example systems and methods may be implemented using any combination of hardware and/or software. In one embodiment, the example systems and methods may be implemented as a set of processor-executable instructions on a computer-readable storage medium. In another example embodiment, the example systems and methods may be implemented as an integrated circuit in an HDTV decoder.

The example systems and methods may be utilized as an alternative to performing motion-adaptive de-interlacing, which is relatively complex and less efficient. Because the present invention does not require inter-field interpolation, motion information need not be obtained. Thus, the present invention provides for more efficient interpolation compared to motion-adaptive interpolation. However, there is a tradeoff in performance with regard to static regions, since intra-field interpolation is better suited for moving regions than static regions. Depending on whether a particular image application is low-end, this tradeoff may be beneficial because hardware costs are reduced.

FIG. 1 shows a block diagram of a system 50 for de-interlacing according to an example embodiment of the present invention. The system 50 may be implemented as an integrated circuit including a coarse estimation unit 20, a fine estimation unit 30, an interpolation unit 40 and an anti-flicker filter 42.

The coarse estimation unit 20 may include an up/down edge detection arrangement 22 and a low/high angle detection arrangement 24. The up/down detection arrangement 22 is configured to determine an up/down directionality of a potential edge. The low/high detection arrangement 24 is configured to determine a low/high directionality of the potential edge. Together the detection arrangements 22, 24 operate to provide an indication of the potential edge's general direction. The general direction may be output by the coarse estimation unit 20 to the fine estimation unit 30.

The fine estimation unit 30 may include a final angle detection arrangement 32 and a direction filter 34. The final angle detection arrangement 32 is configured to determine a preliminary direction of the potential edge. The final angle detection arrangement 32 may, in an example embodiment, utilize the ELA method to locate the preliminary direction. However, other edge-based interpolation techniques are possible.

The direction filter 34 operates to produce a final direction based on the preliminary direction detected by the final angle detection arrangement 32. In an example embodiment, the direction filter 34 may be implemented using an averaging function applied to a set of preliminary directions which includes the preliminary direction of the pixel being interpolated. The direction filter operates as a post-determination filter that corrects errors in the estimation of the preliminary direction by considering preliminary directions of neighboring pixels.

The interpolation unit 40 is configured to enable at least one type of interpolation. In an example embodiment, the interpolation unit 40 is configured to support the performance of cubic interpolation as well as directional interpolation (e.g., using ELA).

The anti-flicker filter 42 is an optional, performance-enhancing filter configured to blend interpolated pixel values generated by the interpolations performed using the interpolation unit 40, e.g., alpha-blending of the directional and cubic interpolation values. A degree to which the values are blended may vary as a function of a smoothness measurement along the (possibly direction-filtered) final direction. When the final direction is sufficiently smooth, only the direction interpolated value may be used. Similarly, if the direction is sufficiently rough, only the cubic interpolation value may be used. The operation of the anti-flicker filter and other components of the system 50 will be described in further detail with reference to the remaining figures.

Figure 2:
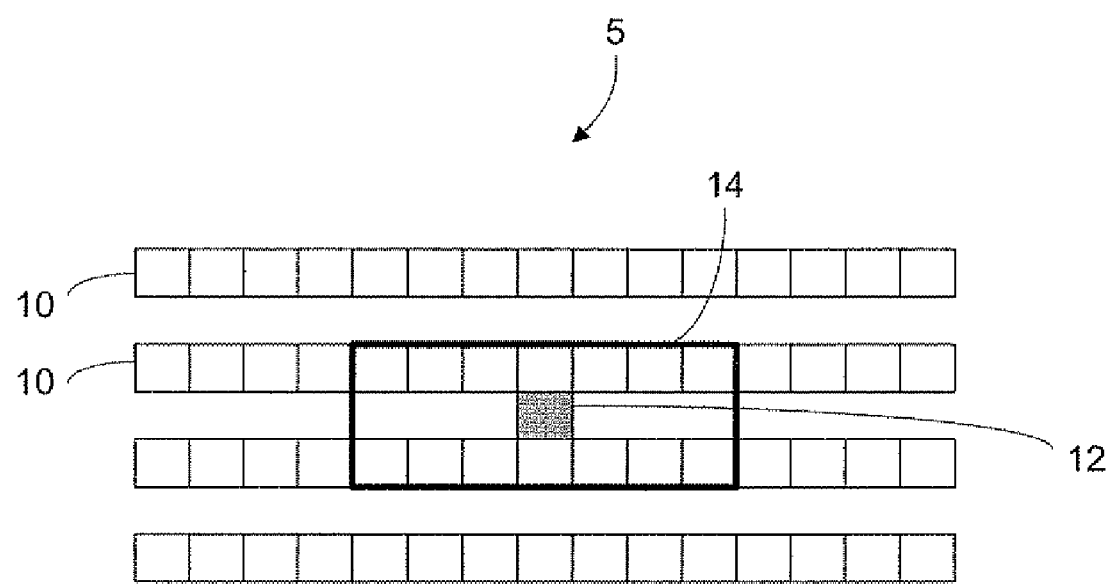
FIG. 2 shows a field portion according to an example embodiment of the present invention.
Figure 3:
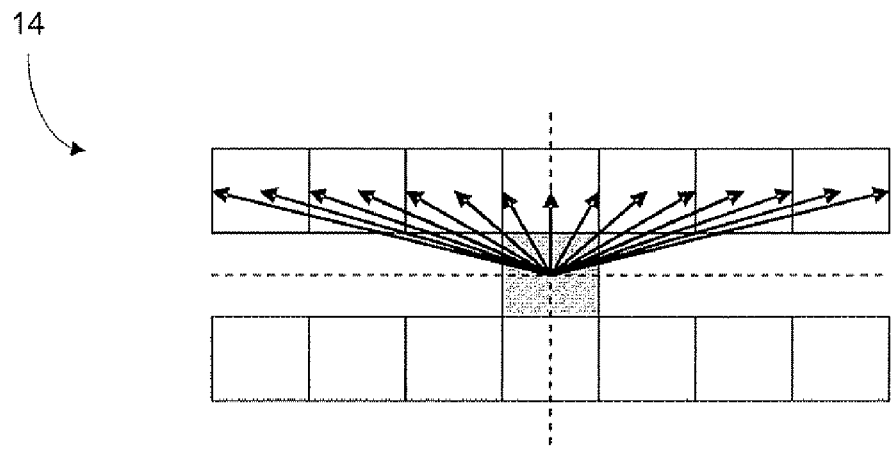
FIG. 3 shows a set of potential edge directions according to an example embodiment of the present invention.
Figure 4:
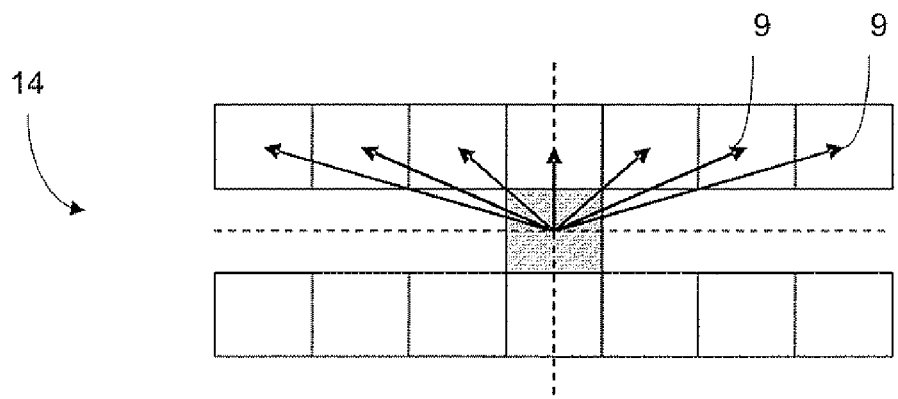
FIG. 4 shows a set of integer precision directions according to an example embodiment of the present invention.
Figure 5:
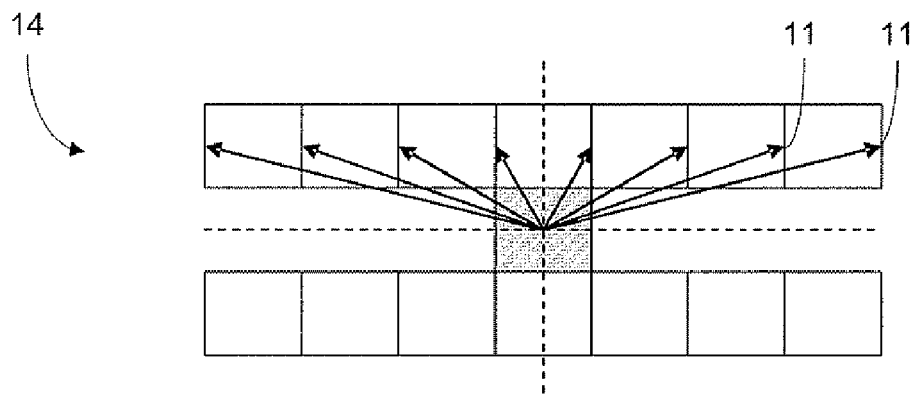
FIG. 5 shows a set of sub-precision directions according to an example embodiment of the present invention.

FIG. 2 shows a field portion 5 according to an example embodiment of the present invention. The field portion 5 includes a plurality of rows 10 above and below a pixel of interest 12, which is a pixel located along a blank row for which interpolation is to be performed. An interpolation window 14 includes rows immediately above and immediately below the pixel 12. The window 14 corresponds to a set of edge directions that intersect at the pixel 12. In FIG. 3, the directions are shown as extending only to a top row located immediately above the pixel 12. However, it will be understood that the directions also extend to a bottom row located immediately below the pixel 12. Referring to FIG. 3, a set of fifteen directions is possible given the size of the window 14, which is 3×7. Depending on the size of the interpolation window, any number of directions is possible. As shown in FIG. 4, the potential directions include integer precision directions 9, which intersect a center of each pixel in the top row. FIG. 5 shows a set of sub-precision directions 11, which intersect an edge of each pixel in the top row and are also included in the set of potential directions.

Figure 6:
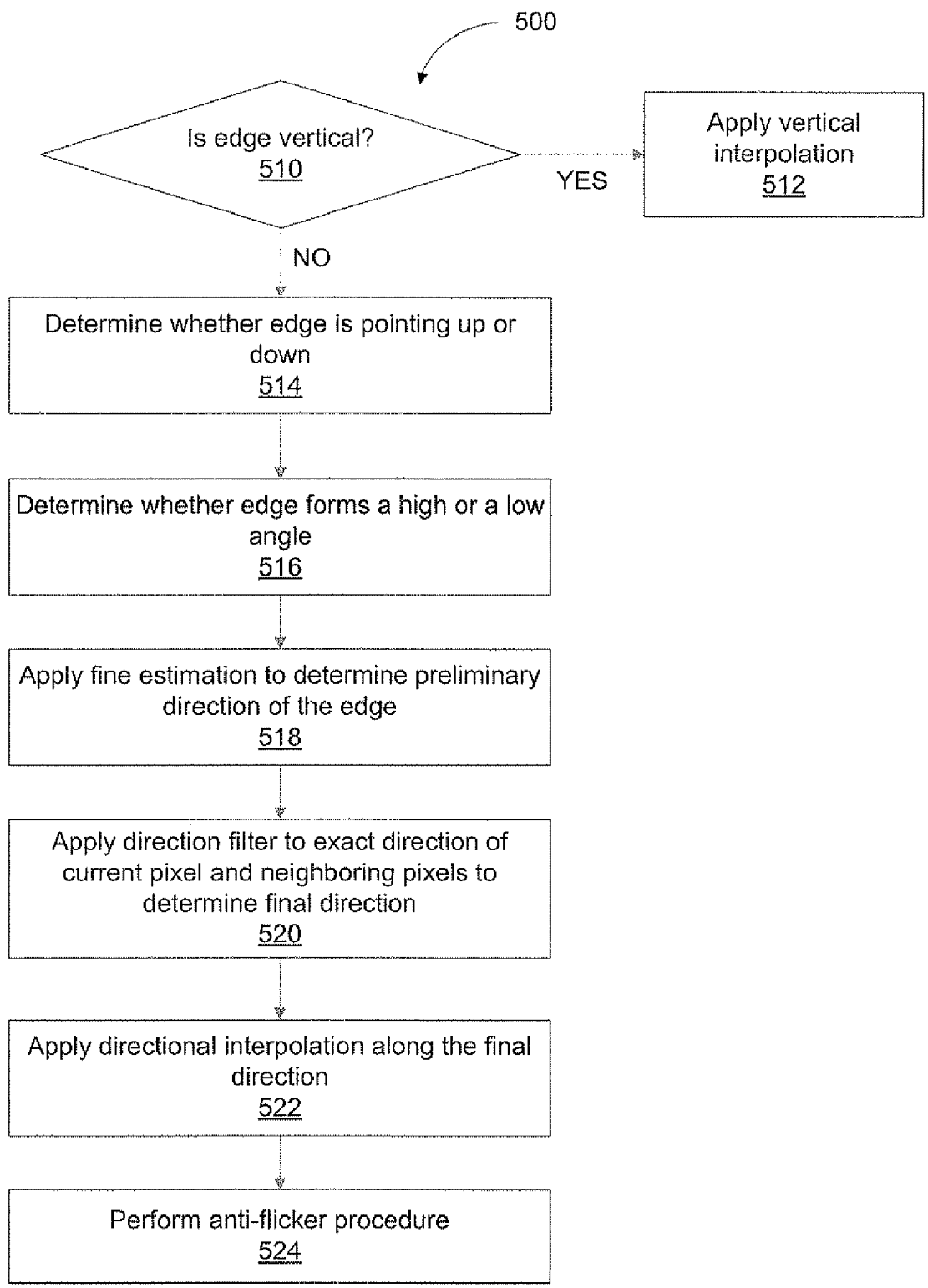
FIG. 6 shows a method for de-interlacing according to an example embodiment of the present invention.

Exemplary embodiments of methods for de-interlacing will now be described. The exemplary methods may be implemented on the system 50, but may also be performed using any combination of hardware and/or software. FIG. 6 shows a method 500 for de-interlacing according to an example embodiment of the present invention. The method 500 begins in 510, where it may be determined whether there is a vertical edge that extends through the pixel 12. If the edge is vertical, then a vertical interpolation may be performed in 512.

Figure 15:
FIG. 15 shows a set of edges with up and down directionality.

If the edge is not vertical, then directional interpolation may be performed, which requires that the direction of the edge be determined. Accordingly, the method 500 proceeds to 514, where it may be determined whether the edge is pointing up or down. For this purpose, the upwards direction may refer to any direction having a positive slope and the downwards direction may refer to a direction having a negative slope. Examples of an up edge 31 and a down edge 33 are shown in FIG. 15.

Figure 16:
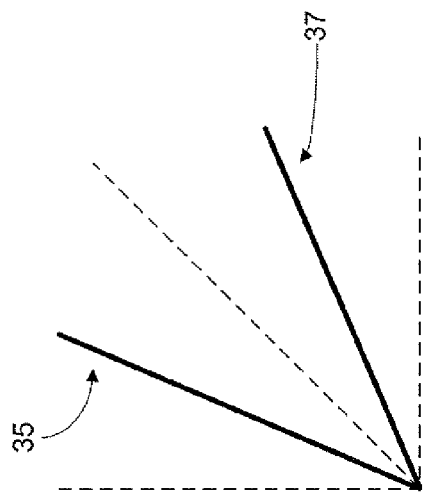
FIG. 16 shows a set of edges with high and low angle directionality.

In 516, it may be determined whether the edge forms a high or low angle. A high angle may be classified as any angle of 45 degrees or greater and a low angle may be less than 45 degrees. However, other classifications are possible and the border between a high angle and a low angle may be different in other embodiments. Examples of a high angle 35 and a low angle 37 are shown in FIG. 16. After the high/low angle estimation is performed, the coarse estimation is complete and the method 500 proceeds to 518.

In 518, a fine estimation may be applied to determine the preliminary direction of the edge. An example of a fine estimation method will be described further below.

In 520, a direction filter is applied to the preliminary direction of the current pixel, e.g., the pixel 12, and neighboring pixels to determine the final direction.

In 522, a directional interpolation may be performed along the final direction. The pixels used in the interpolation may vary depending on whether the direction is sub-precision or integer precision. When the direction is integer precision, only one pixel in the top row and one pixel in the bottom row are intersected and an interpolation value may be calculated by averaging the two pixels. However, when the direction is sub-precision, two pixels in each of the top row and the bottom row are intersected. Accordingly, the interpolation value may be calculated by first averaging the top pixel pair and averaging the bottom pixel pair, then averaging these two average values.

In 524, an anti-flicker procedure may be performed.

It will be understood that the steps described are merely exemplary and that the method 500 may be modified in any number of ways. For example, although the method 500 is shown beginning with a determination of whether the edge is vertical (510), it may also be possible to perform the vertical determination after determining that the angle neither corresponds to a high edge nor a low edge. Thus, in other embodiments, vertical interpolation may be a default interpolation performed when no angled edge is detected.

Figure 7:
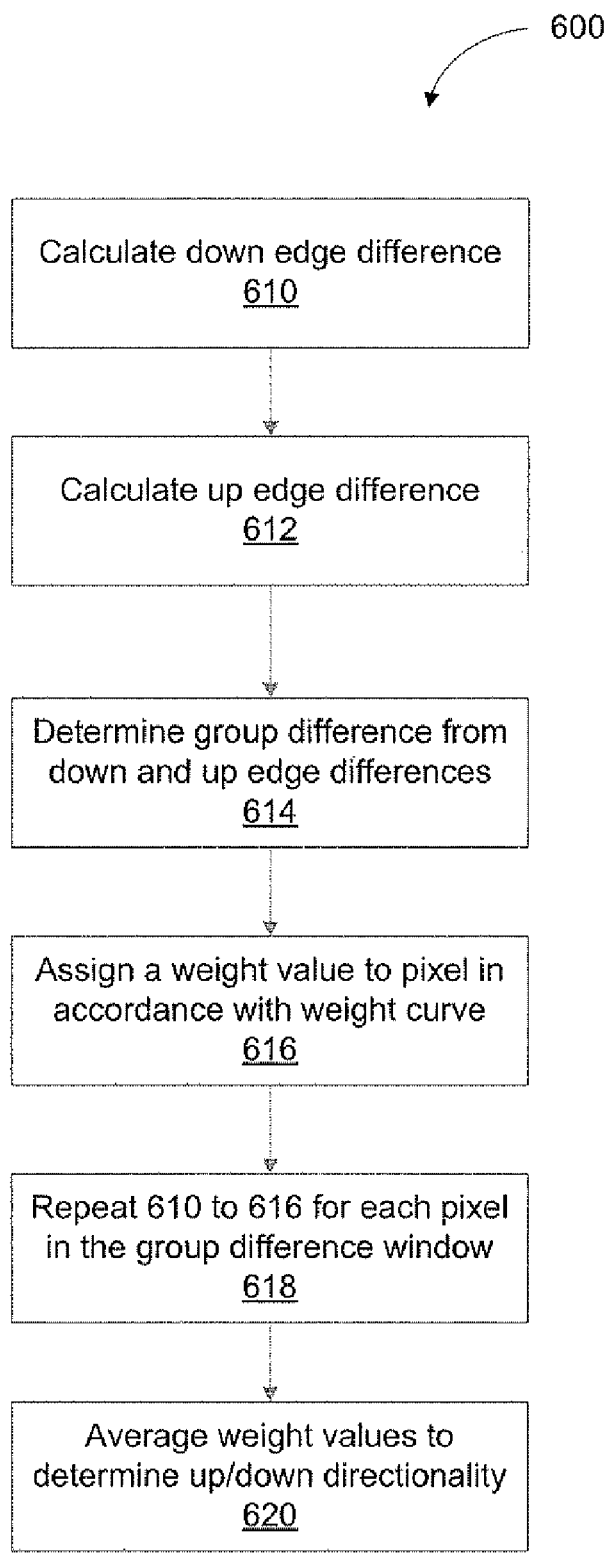
FIG. 7 shows a method for determining up/down directionality according to an example embodiment of the present invention.

FIG. 7 shows a method 600 for determining up/down directionality according to an example embodiment of the present invention. The method 600 begins in 610, where a down edge difference may be calculated. Referring to FIG. 8, the down edge difference may be calculated using a 2×5 group difference window centered about the pixel 12. The down edge difference is calculated as follows: down edge difference=$(abs(A-D)+abs(B-E)+abs(C-F))/2$, where A, B, C refer to the three left-most pixels in the top row and D, E, F refer to the three right-most pixels in the bottom row. Thus, the down edge difference may be a sum of the absolute differences of the top-left pixels and corresponding bottom-right pixels.

In 612, an up edge difference may be calculated. Referring to FIG. 9, the up edge difference may be calculated using the same 2×5 group difference window used to calculate the down edge difference. The up edge difference is calculated as follows: up edge difference=$(abs(C-I)+abs(G-J)+abs(H-D))/2$, where C, G, H refer to the three right-most pixels in the top row and I, J, D refer to the three left-most pixels in the bottom row.

In 614, a group difference may be determined by subtracting the up edge difference from the down edge difference: group difference=down edge difference−up edge difference.

In 616, a weight value may be assigned to the pixel 12 in accordance with a weight curve. As shown in FIG. 10, a weight curve may be constructed to assign the same weight value for group difference values that fall within a certain threshold range. Cutoffs for each range may be experimentally determined. The weight value is an indicator of the likelihood that the edge points up or down. The more negative the weight value, the larger the probability of a down edge, whereas positive weight values are associated with increasing probability of an up edge.

Figure 11:
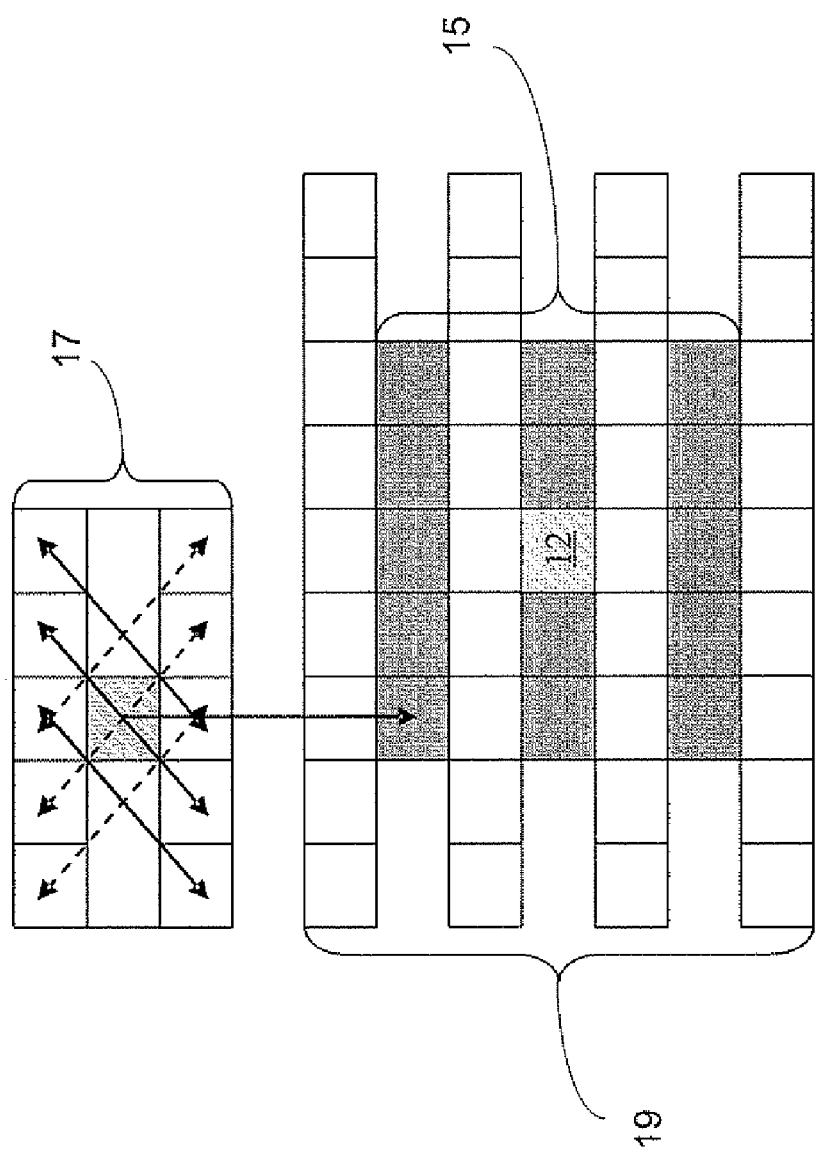
FIG. 11 shows a pixel configuration for determining up/down directionality according to an example embodiment of the present invention.

In 618, steps 610 to 616 may be repeated for each pixel in a weight value window. As shown in FIG. 11, a weight value window 15 defines a 3×5 region of pixels surrounding the pixel 12. Because calculating each weight value requires a 2×5 window 17, a 4×9 window 19 may be required to calculate the weight values for the entire weight value window 15.

In 620, the weight values in the weight value window 15 are averaged to determine up/down directionality. The averaging of the weight values can be viewed as assigning an up or down direction to the edge passing through the pixel 12 as a function of the directionality of a surrounding region, i.e., the window 15.

Figure 12:
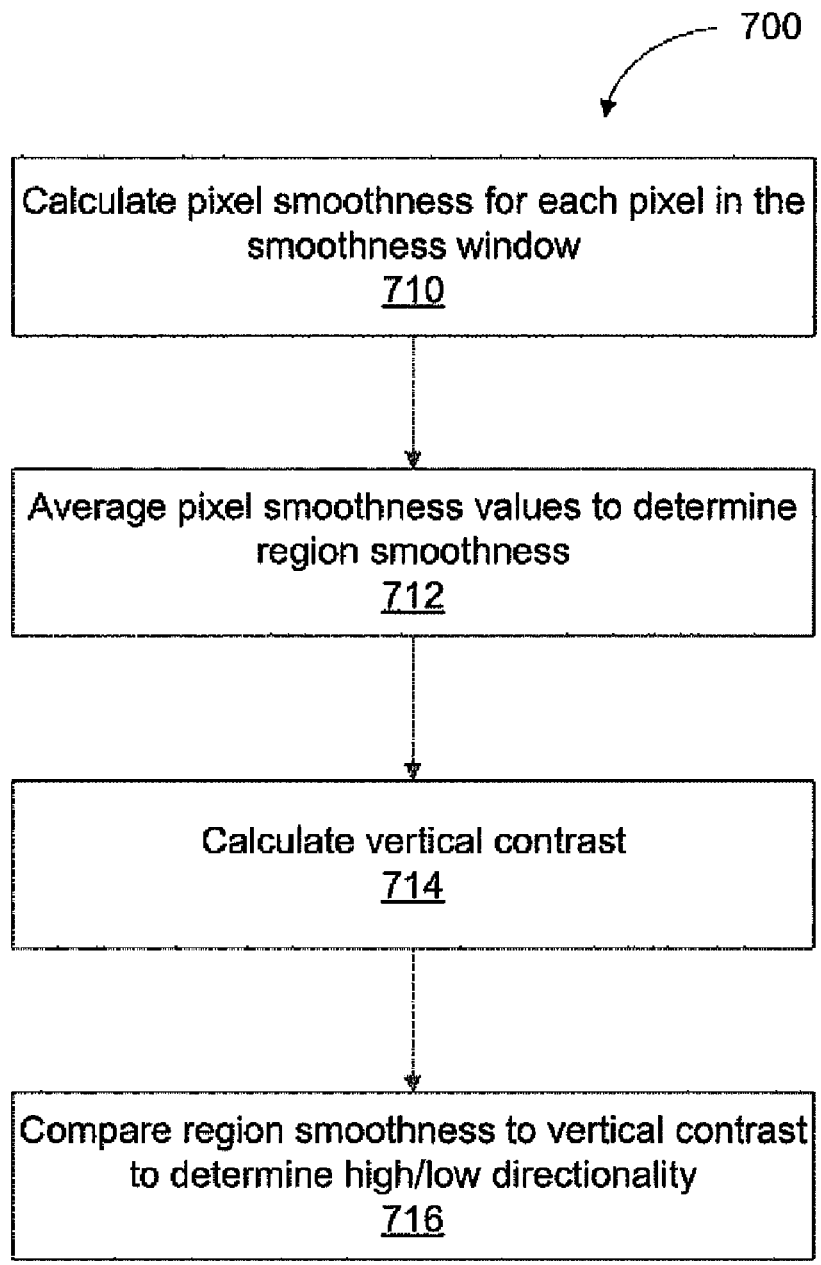
FIG. 12 shows a method for determining high/low directionality according to an example embodiment of the present invention.
Figure 13:
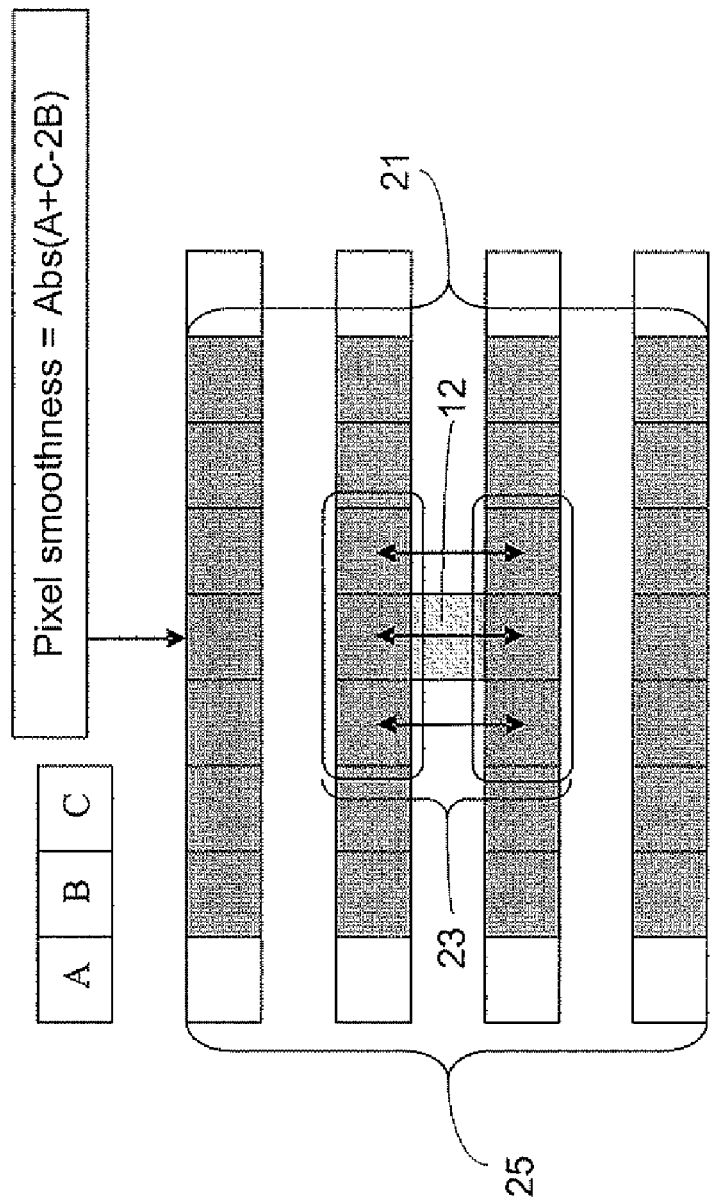
FIG. 13 shows a pixel configuration for determining high/low directionality according to an example embodiment of the present invention.

FIG. 12 shows a method for determining high/low directionality according to an example embodiment of the present invention. In 710, a pixel smoothness for each pixel in a smoothness window may be calculated. FIG. 13 shows an example of a 4×7 smoothness window 21 centered about the pixel 12. Smoothness may be calculated as follows: smoothness=$abs(A+C-2B)$, where A is the value of the pixel to the left of the current pixel, B is the value of the current pixel, and C is the value of the pixel to the right of the current pixel B. Accordingly, a 4×9 window 25 may be required to calculate the smoothness value of each pixel in the smoothness window 21.

In 712, the smoothness values may be averaged to determine a region smoothness for the smoothness window 21.

Figure 14:
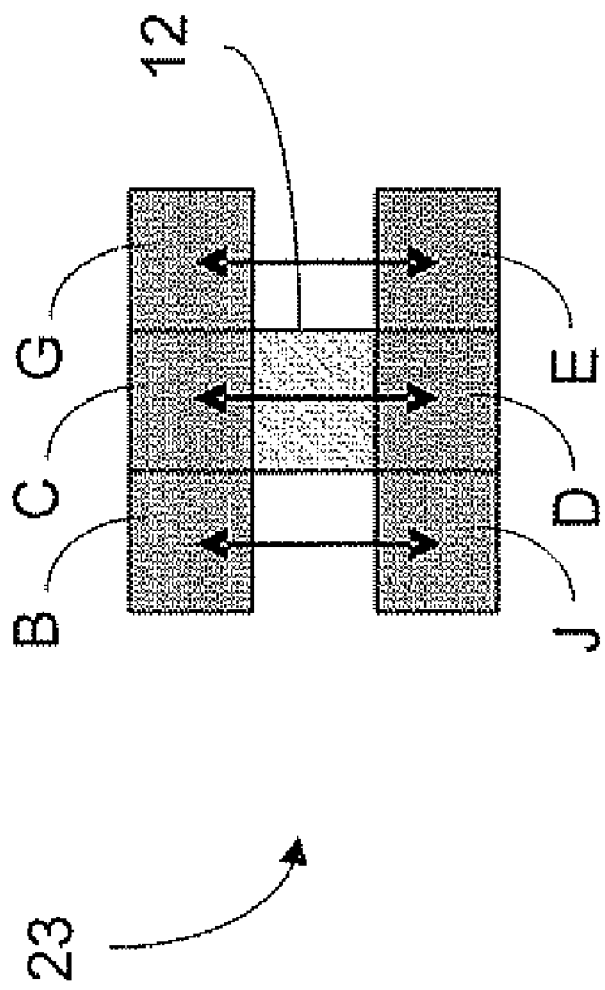
FIG. 14 shows a pixel configuration for calculating a vertical contrast according to an example embodiment of the present invention.

In 714, a vertical contrast may be calculated. Referring back to FIG. 13, the vertical contrast may be calculated using a vertical contrast window 23. FIG. 14 shows that the vertical contrast may be calculated as follows: vertical contrast=abs(B−J)+abs(C−D)+abs(G−E), where B, C, G are the three pixels above the pixel 12 and J, D, E are the three pixels below the pixel 12.

In 716, the region smoothness may be compared to the vertical contrast to determine high/low directionality. For example, if the vertical contrast is greater than or equal to a threshold parameter, which is a function of the region smoothness, then the edge may be classified as a high angle. If the vertical contrast is less than the threshold parameter, the edge may be classified as a low angle. The exact function of the threshold parameter may vary. In one embodiment, the function is scalar, e.g., a scalar coefficient multiplied by the region smoothness. In another embodiment, the function is a linear equation, e.g., a scalar plus a constant value. Other functions may also be possible.

FIG. 17 shows a first region configuration 60 according to an example embodiment of the present invention. The configuration 60 includes angular divisions of a coordinate system centered about the pixel 12. Beginning at an upper quadrant and proceeding clockwise, the coordinate system is divided into regions 1 through 4. Continuing clockwise into a lower quadrant, the coordinate system is divided into corresponding regions 1 through 4. Results of the coarse estimation, which includes the up/down determination of the method 600 and the high/low determination of the method 700 may be viewed as assigning a region to the edge. For example, a down-low edge may be assigned to region 1, a down-high edge to region 2, an up-high edge to region 3, and an up-low edge assigned to region 4. Assigning a region simplifies the process of determining the final direction of the edge, since directions corresponding to angles in other regions need not be considered.

FIG. 18 shows a second region configuration 62 according to an example embodiment of the present invention. The configuration 62 includes the same regions 1 and 4 as the configuration 60, but the regions 2 and 3 have been combined into a single region 7. Thus, region 7 is assigned to high angles, regardless of whether the edge points up or down. An advantage of combining the regions in this manner is that high angles are more easily detected than low angles, so it may not be necessary to discriminate between up and down directions if the angle is high. This reduces the implementation costs involved in determining direction. Other combinations may also be possible.

Figure 19:
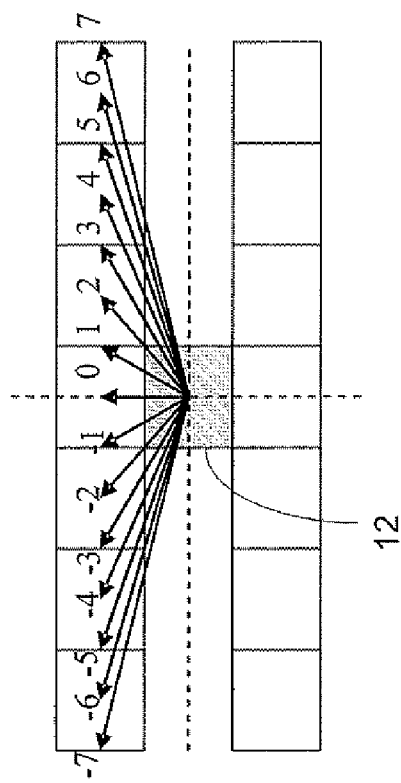
FIG. 19 shows a direction value map according to an example embodiment of the present invention.

FIG. 19 shows a direction value map according to an example embodiment of the present invention. The direction value map assigns a value for each direction. Since there are fifteen directions, the values may range from −7 to 7. The pixel 12 may be assigned a direction value corresponding to the preliminary direction output by the fine estimation.

Figure 20:
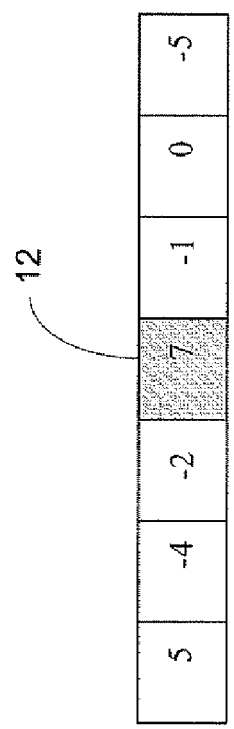
FIG. 20 shows a set of direction values according to an example embodiment of the present invention.

FIG. 20 shows a set of direction values to which a direction filter may be applied according to an example embodiment of the present invention. The direction values correspond to a set of seven pixels in an interpolated row, where the center pixel is the pixel of interest, e.g., the pixel 12. The direction filter may be an averaging filter that increases the smoothness and convergence of the direction values, thereby reducing detection error. In the example shown in FIG. 20, the average of all seven direction values is zero, which, as indicated in the direction map of FIG. 19, corresponds to the vertical direction. Therefore, vertical interpolation would be performed. It should be noted that low average direction values may be attributed to fluctuations in direction, as FIG. 20 shows. Thus, in cases where the direction cannot be reasonably determined because of fluctuations, vertical interpolation should be used since it is the most conservative interpolation method. With vertical interpolation, the only artifacts produced are jagged edges in low angle regions. Other interpolation methods may introduce more noticeable artifacts when the direction is wrongly estimated.

In an alternative embodiment, the direction filter may apply a weighted average. Further, coefficients for the weighted average may accord more weight to the center pixel, e.g., the pixel 12. For example, coefficients for each pixel, from left to right, may be ⅛, ⅛, ⅛, ¼, ⅛, ⅛ and ⅛.

Figure 21:
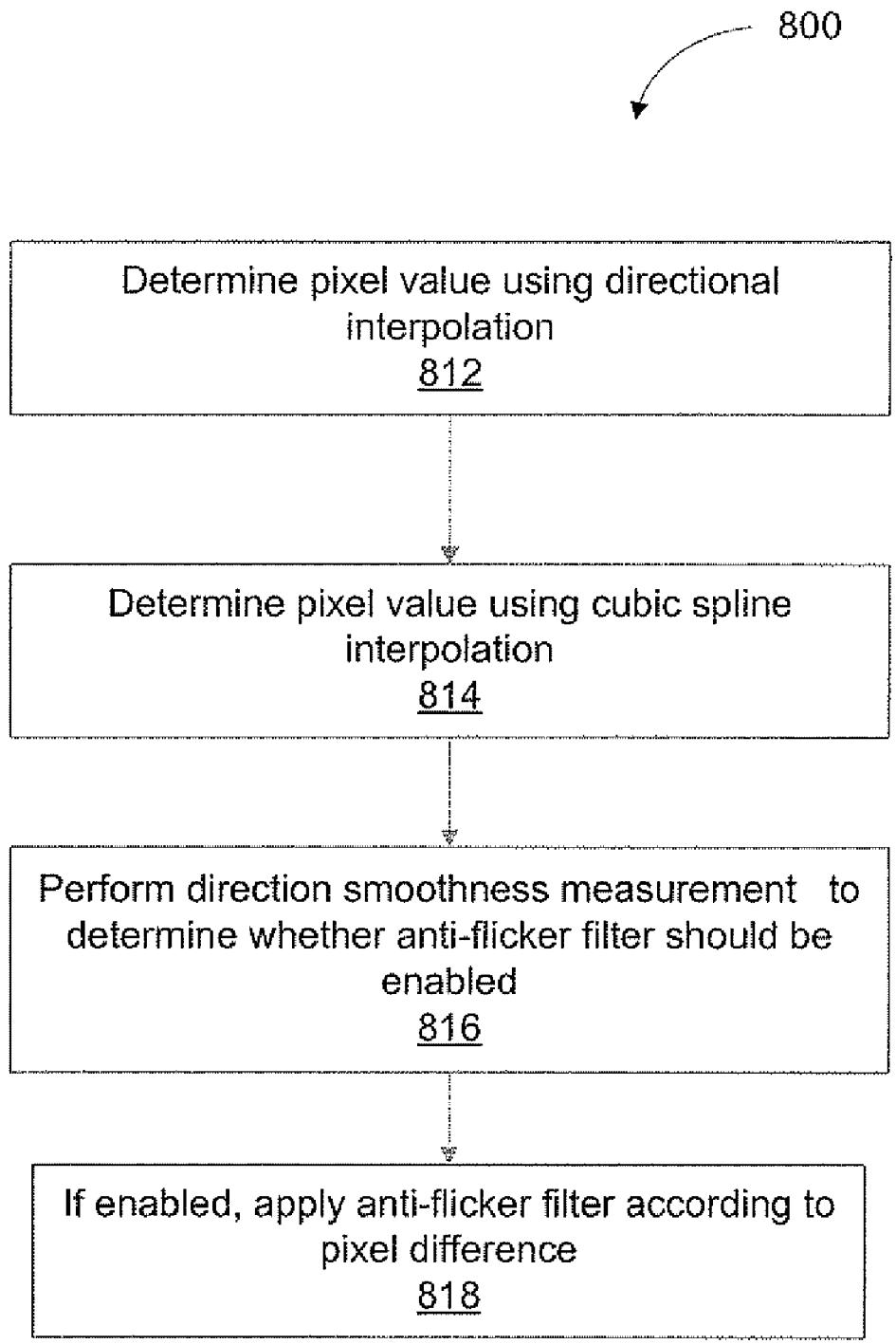
FIG. 21 shows a method for performing an anti-flicker procedure according to an example embodiment of the present invention.

FIG. 21 shows a method 800 for performing an anti-flicker procedure according to an example embodiment of the present invention. In 812, a pixel value is determined using directional interpolation, e.g., using the methods previously described.

In 814, a pixel value is determined for the same pixel using cubic interpolation.

Figure 22:
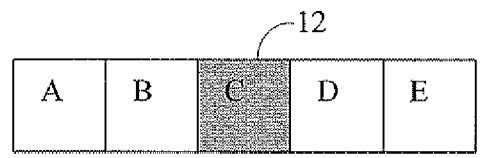
FIG. 22 shows a direction smoothness measurement according to an example embodiment of the present invention.

In 816, a direction smoothness measurement may be performed by comparing the preliminary direction values of a set of pixels near the pixel 12. That is, the direction smoothness is calculated based on the direction values of the pixels before the direction filter is applied. As shown in FIG. 22, if the preliminary direction values for a set of pixels are [A, B, C, D, E], then the direction smoothness may be calculated as follows: Direction smoothness=abs(A−B)+abs(B−C)+abs(C−D)+abs(D−E). As an illustrative example, if the pixel values along the preliminary direction are the same as those shown in FIG. 20, i.e., [−4, −2, 7, −1, 0], the direction smoothness has a value of 2+9+8+1=20, meaning there exists a large degree of fluctuation and the anti-flicker filter is enabled. On the other hand, if the pixel values along the preliminary direction are [6, 7, 7, 7, 6], the direction smoothness has a value of 1+0+0+1=2, meaning there is little fluctuation and the anti-flicker filter is disabled. When the direction smoothness exceeds a threshold value, the anti-flicker filter is enabled. Otherwise, the anti-flicker filter is disabled.

In 818, if the anti-flicker filter has been enabled, it may be applied in accordance with a blending curve, which indicates an extent to which anti-flickering should be performed. When enabled, the anti-flicker filter may perform blending, e.g., alpha-blending, of the pixel values generated by the directional and cubic interpolations as a function of weights assigned to each interpolation. Blending may involve mapping a pixel difference value to an alpha value from which the weights are calculated. The pixel difference may be calculated as a difference between two pixels along opposite ends of the final direction (when the final direction is integer precision) or a difference between average values of pixel sets located along opposite ends of the final direction (when the final direction is sub-precision). When the pixel difference is large, this indicates that an estimated direction is probably inaccurate, which may result in flicker artifacts. In this situation, the anti-flicker filter may accord more weight to the cubic interpolation. However, if the pixel difference is sufficiently small, cubic interpolation may be accorded less weight than directional interpolation.

Figure 23:
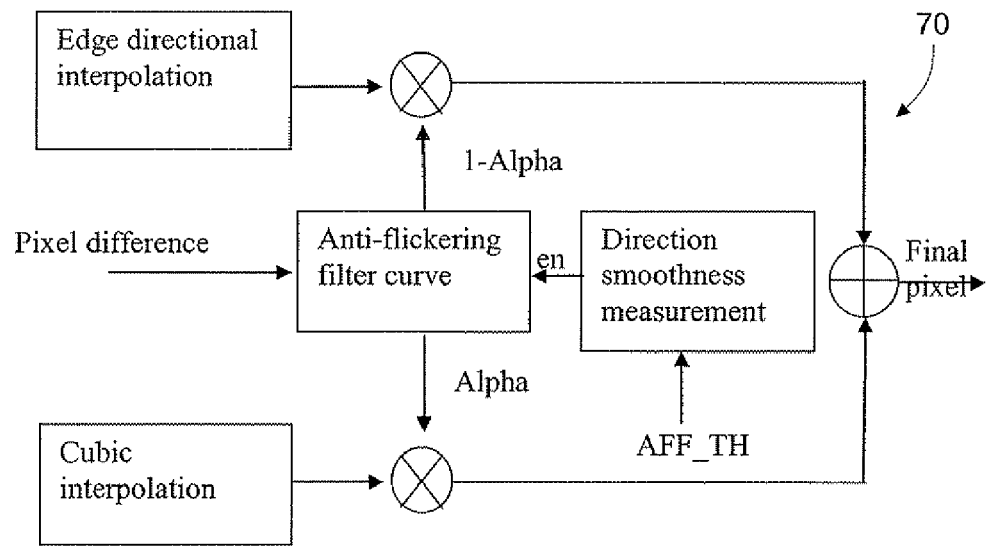
FIG. 23 shows data flow in an anti-flicker procedure according to an example embodiment of the present invention.

FIG. 23 shows a data flow diagram 70 for an anti-flicker procedure performed in accordance with the method 800. Edge directional interpolation and cubic interpolation are performed and output to mixers, the outputs of which are combined to generate a final pixel value. The mixers are controlled by an anti-flicker filter as a function of a pixel difference. A smoothness measurement compares a directional smoothness to a threshold value, AFF_TH. If the threshold is exceeded, the anti-flicker filter is enabled. The anti-flicker filter uses an alpha-blending curve. A coefficient of 1−Alpha may be assigned to the mixer associated with directional interpolation and a coefficient of Alpha may be assigned to the mixer associated with cubic interpolation. An adder generates the final pixel value by adding the outputs of the mixers. For example, the final pixel value may be calculated as: (1−Alpha)*(directional interpolation pixel value)+ Alpha*(cubic interpolation value).

Figure 24:
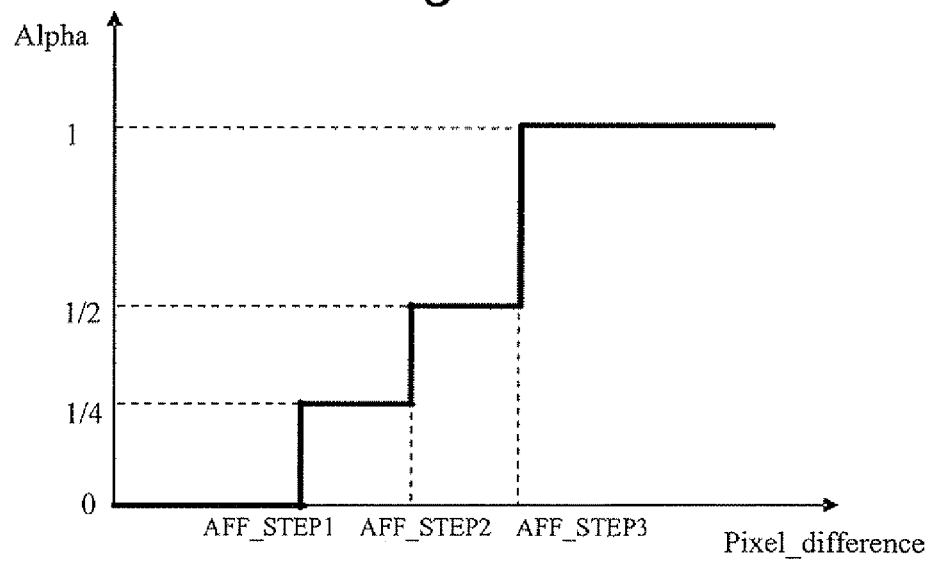
FIG. 24 shows a blending curve for an anti-flicker filter according to an example embodiment of the present invention.

Referring to FIG. 24, an anti-flicker filter curve 23 may be shaped as a step function with steps located at various threshold points, AF_STEP1, AFF_STEP2 and AFF_STEP3 as a function of the pixel difference. Alpha may vary between zero and one. When the pixel difference is small, Alpha may be zero and the final pixel value is equal to the output of the directional interpolation. When the pixel difference is large, Alpha may be one and the final pixel value is equal to the output of the cubic interpolation.

In the preceding specification, the present invention has been described with reference to specific example embodiments thereof. It will, however, be evident that various modifications and changes may be made thereunto without departing from the broader spirit and scope of the present invention as set forth in the claims that follow. For example, the embodiments may be adapted for use in conjunction with motion-adaptive de-interlacing techniques which utilize both intra-field de-interlacing and inter-field de-interlacing. It will be appreciated that by adding a motion detection arrangement and a memory configured to store information for at least one field, e.g., a field buffer implemented using DDR or DDRII memory, support for motion-adaptive de-interlacing may be achieved without extensive modifications to the example systems described above. A further optimization may involve elimination of the anti-flicker filter, since the performance increase associated with motion-adaptive de-interlacing may obviate a need for anti-flickering.

The embodiments described herein may be presented combined with each other in various combinations. The specification and drawings are accordingly to be regarded in an illustrative rather than restrictive sense.

What is claimed is:

1. A method of intra-field de-interlacing, comprising:
   performing a coarse estimation to eliminate at least one direction from a set of edge candidate directions that extend from a pixel being interpolated, without directly evaluating each direction;
   after performing the coarse estimation, performing a fine estimation in which a set of remaining candidate directions are evaluated to select a single direction as corresponding to an edge; and
   performing a directional interpolation as a function of the single selected direction to generate a pixel value for the pixel being interpolated.

2. The method of claim 1, wherein the coarse estimation includes determining whether the edge points up or down.

3. The method of claim 2, wherein the determining of whether the edge points up or down comprises:
   calculating a first sum of absolute differences between a left-most set of pixels located in a window along a row above the pixel being interpolated and a right-most set of pixels located in the window along a row below the pixel being interpolated;
   calculating a second sum of absolute differences between a right-most set of pixels located in the window along the row above the pixel being interpolated and a left-most set of pixels located in the window along the row below the pixel being interpolated; and
   calculating a difference between the first sum and the second sum.

4. The method of claim 3, further comprising:
   applying a weight curve to the difference between the first sum and the second sum to determine an up/down directionality of the edge.

5. The method of claim 1, wherein the coarse estimation includes determining whether the edge is oriented at a high angle or a low angle.

6. The method of claim 5, wherein the determining of whether the edge is oriented at a high or low angle comprises:
   calculating a pixel smoothness value for a plurality of pixels located in a region surrounding the pixel being interpolated;
   averaging the pixel smoothness values to generate a region smoothness value;
   calculating a vertical contrast value as a function of pixels above and below the pixel being interpolated; and
   comparing the region smoothness value to the vertical contrast value.

7. The method of claim 6, further comprising:
   determining the edge to be oriented at a high angle when the region smoothness value exceeds a function of the vertical contrast value, and oriented at a low angle when the region smoothness value does not exceed the function of the vertical contrast value.

8. The method of claim 1, wherein the coarse estimation assigns an angular region to the edge, the angular region comprising a subset of the set of edge candidate directions.

9. The method of claim 1, wherein the fine estimation includes performing an Edge Line Average (ELA) procedure to select the single direction from the set of remaining candidate directions after the at least one direction is eliminated.

10. The method of claim 1, further comprising:
    applying a direction filter to a set of selected directions, including the single selected direction, to generate a final direction as a substitute for the single selected direction for when the directional interpolation is performed.

11. The method of claim 10, wherein the direction filter is configured to average values associated with the final direction of a set of pixels located along an interpolated row, the set of pixels including the pixel being interpolated.

12. The method of claim 1, further comprising:
    applying an anti-flicker filter to the generated pixel value, the anti-flicker filter configured to perform a blending of the generated pixel value with a second pixel value generated using a different interpolation technique.

13. The method of claim 12, wherein the different interpolation technique is a cubic interpolation.

14. The method of claim 12, further comprising:
    performing a smoothness measurement to evaluate a smoothness of preliminary direction values near the pixel being interpolated; and
    performing the blending as a function of the smoothness measurement.

15. The method of claim 14, wherein more weight is accorded to the generated pixel value than to the second pixel value when the smoothness measurement indicates that the preliminary direction values are smooth.

16. The method of claim 12, wherein the blending is alpha-blending.

17. A device for intra-field de-interlacing, comprising:
- a coarse estimation unit configured to eliminate at least one direction from a set of edge candidate directions that extend from a pixel being interpolated, without directly evaluating each direction;
- a fine estimation unit configured to, after the coarse estimation unit has eliminated the at least one direction, evaluate a set of remaining candidate directions to select a single direction as corresponding to an edge; and
- an interpolation unit configured to perform a directional interpolation as a function of the single selected direction to generate a pixel value for the pixel being interpolated.

18. The device of claim 17, wherein the coarse estimation unit is configured to determine whether the edge points up or down.

19. The device of claim 18, wherein the coarse estimation unit is configured to determine whether the edge points up or down by:
- calculating a first sum of absolute differences between a left-most set of pixels located in a window along a row above the pixel being interpolated and a right-most set of pixels located in the window along a row below the pixel being interpolated;
- calculating a second sum of absolute differences between a right-most set of pixels located in the window along the row above the pixel being interpolated and a left-most set of pixels located in the window along the row below the pixel being interpolated; and
- calculating a difference between the first sum and the second sum.

20. The device of claim 19, wherein the coarse estimation unit is configured to apply a weight curve to the difference between the first sum and the second sum to determine an up/down directionality of the edge.

21. The device of claim 17, wherein the coarse estimation unit is configured to determine whether the edge is oriented at a high angle or a low angle.

22. The device of claim 21, wherein the coarse estimation unit is configured to determine whether the edge is oriented at a high or low angle by:
- calculating a pixel smoothness value for a plurality of pixels located in a region surrounding the pixel being interpolated;
- averaging the pixel smoothness values to generate a region smoothness value;
- calculating a vertical contrast value as a function of pixels above and below the pixel being interpolated; and
- comparing the region smoothness value to the vertical contrast value.

23. The device of claim 22, wherein the coarse estimation unit is configured to determine the edge to be oriented at a high angle when the region smoothness value exceeds a function of the vertical contrast value, and oriented at a low angle when the region smoothness value does not exceed the function of the vertical contrast value.

24. The device of claim 17, wherein the coarse estimation unit is configured to assign an angular region to the edge, the angular region comprising a subset of the set of edge candidate directions.

25. The device of claim 17, wherein the fine estimation unit is configured to perform an Edge Line Average (ELA) procedure to select the single direction from the set of remaining candidate directions after the at least one direction is eliminated.

26. The device of claim 17, further comprising:
- a direction filter configured to filter a set of selected directions, including the single selected direction, to generate a final direction as a substitute for the single selected direction for when the directional interpolation is performed.

27. The device of claim 26, wherein the direction filter is configured to average values associated with the final direction of a set of pixels located along an interpolated row, the set of pixels including the pixel being interpolated.

28. The device of claim 17, further comprising:
- an anti-flicker filter configured to perform a blending of the generated pixel value with a second pixel value generated using a different interpolation technique.

29. The device of claim 28, wherein the different interpolation technique is a cubic interpolation.

30. The device of claim 28, wherein the anti-flicker filter is configured to:
- perform a smoothness measurement to evaluate a smoothness of preliminary direction values near the pixel being interpolated; and
- perform the blending as a function of the smoothness measurement.

31. The device of claim 30, wherein more weight is accorded to the generated pixel value than to the second pixel value when the smoothness measurement indicates that the preliminary direction values are smooth.

32. The device of claim 28, wherein the blending is alpha-blending.

33. A non-transitory computer-readable storage medium having stored thereon a series of instructions executable by a processor, the instructions configured to cause the processor to perform the steps of:
- performing a coarse estimation to eliminate at least one direction from a set of edge candidate directions that extend from a pixel being interpolated, without directly evaluating each direction;
- after performing the coarse estimation, performing a fine estimation in which a set of remaining candidate directions are evaluated to select a single direction as corresponding to an edge; and
- performing a directional interpolation as a function of the single selected direction to generate a pixel value for the pixel being interpolated.

34. A method of intra-field de-interlacing, comprising:
- performing a coarse estimation to eliminate at least one direction from a set of edge candidate directions without directly evaluating each direction;
- performing a fine estimation to select a single direction as corresponding to an edge; and
- performing a directional interpolation as a function of the single selected direction to generate a pixel value for a pixel being interpolated;
- wherein:
  - the coarse estimation includes determining whether the edge is oriented at a high angle or a low angle; and
  - the determining of whether the edge is oriented at a high or low angle comprises:
    - calculating a pixel smoothness value for a plurality of pixels located in a region surrounding the pixel being interpolated;
    - averaging the pixel smoothness values to generate a region smoothness value;
    - calculating a vertical contrast value as a function of pixels above and below the pixel being interpolated; and comparing the region smoothness value to the vertical contrast value.

35. The method of claim 34, further comprising:
determining the edge to be oriented at a high angle when the region smoothness value exceeds a function of the vertical contrast value, and oriented at a low angle when the region smoothness value does not exceed the function of the vertical contrast value.

36. A method of intra-field de-interlacing, comprising:
performing a coarse estimation to eliminate at least one direction from a set of edge candidate directions without directly evaluating each direction;
performing a fine estimation to select a single direction as corresponding to an edge;
performing a directional interpolation as a function of the single selected direction to generate a pixel value for a pixel being interpolated;
applying an anti-flicker filter to the generated pixel value, the anti-flicker filter configured to perform a blending of the generated pixel value with a second pixel value generated using a different interpolation technique;
performing a smoothness measurement to evaluate a smoothness of preliminary direction values near the pixel being interpolated; and
performing the blending as a function of the smoothness measurement.

37. The method of claim 36, wherein more weight is accorded to the generated pixel value than to the second pixel value when the smoothness measurement indicates that the preliminary direction values are smooth.

38. A device for intra-field de-interlacing, comprising:
a coarse estimation unit configured to eliminate at least one direction from a set of edge candidate directions without directly evaluating each direction;
a fine estimation unit configured to select a single direction as corresponding to an edge; and
an interpolation unit configured to perform a directional interpolation as a function of the single selected direction to generate a pixel value for a pixel being interpolated;
wherein the coarse estimation unit is configured to determine whether the edge is oriented at a high angle or a low angle by:
calculating a pixel smoothness value for a plurality of pixels located in a region surrounding the pixel being interpolated;
averaging the pixel smoothness values to generate a region smoothness value;
calculating a vertical contrast value as a function of pixels above and below the pixel being interpolated; and
comparing the region smoothness value to the vertical contrast value.

39. The device of claim 38, wherein the coarse estimation unit is configured to determine the edge to be oriented at a high angle when the region smoothness value exceeds a function of the vertical contrast value, and oriented at a low angle when the region smoothness value does not exceed the function of the vertical contrast value.

40. A device for intra-field de-interlacing, comprising:
a coarse estimation unit configured to eliminate at least one direction from a set of edge candidate directions without directly evaluating each direction;
a fine estimation unit configured to select a single direction as corresponding to an edge;
an interpolation unit configured to perform a directional interpolation as a function of the single selected direction to generate a pixel value for a pixel being interpolated; and
an anti-flicker filter configured to perform a blending of the generated pixel value with a second pixel value generated using a different interpolation technique;
wherein the anti-flicker filter is configured to:
perform a smoothness measurement to evaluate a smoothness of preliminary direction values near the pixel being interpolated; and
perform the blending as a function of the smoothness measurement.

41. The device of claim 40, wherein more weight is accorded to the generated pixel value than to the second pixel value when the smoothness measurement indicates that the preliminary direction values are smooth.

* * * * *